United States Patent
Szeto et al.

(10) Patent No.: US 7,359,943 B2
(45) Date of Patent: Apr. 15, 2008

(54) PROVIDING INSTANT MESSAGING FUNCTIONALITY IN NON-INSTANT MESSAGING ENVIRONMENTS

(75) Inventors: Christopher Tzann-En Szeto, San Jose, CA (US); Chintamani Patwardhan, Sunnyvale, CA (US); Henri Torgemane, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 723 days.

(21) Appl. No.: 10/057,735

(22) Filed: Jan. 22, 2002

(65) Prior Publication Data

US 2003/0140103 A1    Jul. 24, 2003

(51) Int. Cl.
    *G06F 15/16*    (2006.01)
(52) U.S. Cl. ..................... 709/206; 709/227
(58) Field of Classification Search ........... 709/206, 709/202, 205, 204, 216, 225, 200, 227; 715/513; 370/259, 546; 717/174, 176, 177, 178
    See application file for complete search history.

(56) References Cited

U.S. PATENT DOCUMENTS

| | | | | |
|---|---|---|---|---|
| 6,717,938 | B1 * | 4/2004 | D'Angelo | 370/352 |
| 6,910,186 | B2 * | 6/2005 | Kim | 715/706 |
| 2001/0003202 | A1 | 6/2001 | Mache et al. | 713/152 |
| 2001/0018658 | A1 * | 8/2001 | Kim | 705/1 |
| 2001/0027474 | A1 * | 10/2001 | Nachman et al. | 709/204 |
| 2002/0006803 | A1 | 1/2002 | Mendiola et al. | 455/466 |
| 2002/0018658 | A1 * | 2/2002 | Sakai et al. | 399/38 |
| 2002/0099777 | A1 * | 7/2002 | Gupta et al. | 709/206 |
| 2002/0152402 | A1 | 10/2002 | Tov et al. | 713/201 |
| 2002/0169875 | A1 * | 11/2002 | Furui et al. | 709/225 |
| 2002/0194272 | A1 * | 12/2002 | Zhu | 709/204 |

OTHER PUBLICATIONS

Anon, "DigiChat Product Information", http://www.digichat.com/PI_featureSet.html.
Field, Alan, "Instant Messaging comes of Age for Enterprise" NewsFactor Network, pp. 1-4, May 21, 2002.
"Unified Messaging Center", http://web.icq.com, no date.
"Private-Label Instant Messaging Clients," http://corp.odigo.com/products/clients.html, no date.
"Java Applet", http://corp.odigo.com/products/clients/express.html, no date.
Gregg Keizer, "Excite Messenger", CNET review, Feb. 8, 2001, http://www.cnet.com.
"Zaplet Appmail", http://zaplet.com, no date.

* cited by examiner

*Primary Examiner*—William Vaughn
*Assistant Examiner*—Joseph Maniwang
(74) *Attorney, Agent, or Firm*—Hickman Palermo Truong & Becker

(57) ABSTRACT

A system and method are disclosed for enabling a guest user who is not a registered user of an instant messaging system to communicate by instant messaging with a registered user of the system. An indication that the guest user desires to communicate with the registered user by instant messaging is received. Browser-executable computer code comprising computer instructions for providing at least limited instant messaging functionality to the guest user at the guest user's client computer system, without requiring the guest user to download and install client side instant messaging application software and without requiring the guest user to register as a user of the instant messaging system, is sent to the guest user's client computer system. An instant messaging session between the guest user and the registered user is facilitated.

35 Claims, 15 Drawing Sheets

//PROVIDING INSTANT MESSAGING FUNCTIONALITY IN NON-INSTANT MESSAGING ENVIRONMENTS

FIELD OF THE INVENTION

The present invention relates generally to instant messaging. A system and method for providing instant messaging functionality in a non-instant messaging environment is disclosed.

BACKGROUND OF THE INVENTION

Instant messaging technology enables two or more participants to communicate via a computer network, such as the Internet, in more or less real time. Typically, each participant uses a client computer system to send and receive messages. Each client computer system typically is connected via a network to an instant messaging connection server. The connection server receives and processes messages from participants, including by forwarding them to the client systems of the other participants for display. The connection server may also be configured to send messages on behalf of the system, such as to inform participants that a fellow participant has disconnected or logged off.

Typically, instant messaging application software is installed at each client system to enable the client system to be used as an instant messaging client. The instant messaging software may be made available for download, for example, from a web page accessible via the Internet. A user invokes this software on the client system in order to communicate by instant messaging with one or more other participants. The client side application software typically establishes a connection between the client system and the connection server and either automatically logs the user into the connection server or prompts the user to enter the information necessary to log in, such as a user name and password. The user may then communicate by means of instant messaging with one or more other users who are logged into the instant messaging system at that time.

Under this approach, only users who have downloaded or otherwise installed the client side instant messaging software that enables them to connect to the same instant messaging system may communicate with each other. Moreover, typically the process of downloading or otherwise installing the client side instant messaging application software includes a registration process in which the user registers as a user of the system by establishing a user name and account. This process requires time to complete, which discourages some potential new users from registering and downloading the required software. As a result, instant messaging users are typically limited to communicating by instant messaging only with other users who have registered with and downloaded the client side software provided by the particular instant messaging service provider with whom they have registered and whose client side software they have installed. If a user of such a system wishes to communicate by instant messaging with someone who is not a registered user of that system, the user typically must ask the individual with whom he wishes to communicate to download or otherwise obtain the software and register as a user in order to be able to do so.

Therefore, there is a need for a way to enable an instant messaging user to communicate by instant messaging with a person who has neither downloaded or otherwise installed the client side instant messaging application software normally required for such communication nor registered and logged in as a registered user of the instant messaging system. There also is a need for a way for such a user to invite someone who may or may not be a registered user of the particular instant messaging system used by the user to communicate with the user by instant messaging. There is also a need to provide instant messaging functionality to a client system without requiring that client side application software be downloaded and installed, and without requiring that a person register as a user before communicating. Finally, there is a need to enable a guest user who is not a registered user to connect to and communicate through use of an instant messaging connection server.

SUMMARY OF THE INVENTION

A system and method for providing instant messaging functionality in a non-instant messaging environment is disclosed. A guest user indicates his or her interest in communicating through instant messaging. The guest user is connected to a connection server and assigned a temporary user identification. The guest user uses this temporary identification to communicate by instant messaging with a registered user of the instant messaging system.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

A method for enabling a guest user who is not a registered user of an instant messaging system to communicate by instant messaging with a registered user of the system is disclosed. In one embodiment, an indication that the guest user desires to communicate with the registered user by instant messaging is received. Browser-executable computer code comprising computer instructions for providing at least limited instant messaging functionality to the guest user at the guest user's client computer system, without requiring the guest user to download and install client side instant messaging application software and without requiring the guest user to register as a user of the instant messaging system, is sent to the guest user's client computer system. An instant messaging session between the guest user and the registered user is facilitated.

A system for enabling a guest user who is not a registered user of an instant messaging system to communicate by instant messaging with a registered user of the system is disclosed. In one embodiment, the system comprises a web server and an instant messaging server. The web server is configured to receive an indication that the guest user desires to communicate with the registered user by instant messaging and send to a client computer system associated with the guest user browser-executable computer code comprising computer instructions for providing at least limited instant messaging functionality to the guest user at the client computer system, without requiring the guest user to download and install client side instant messaging application software and without requiring the guest user to register as a user of the instant messaging system. The instant messaging server is configured to facilitate an instant messaging session between the guest user and the registered user. In other embodiments, the web server and/or instant messaging server may comprise a plurality of servers.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1A:
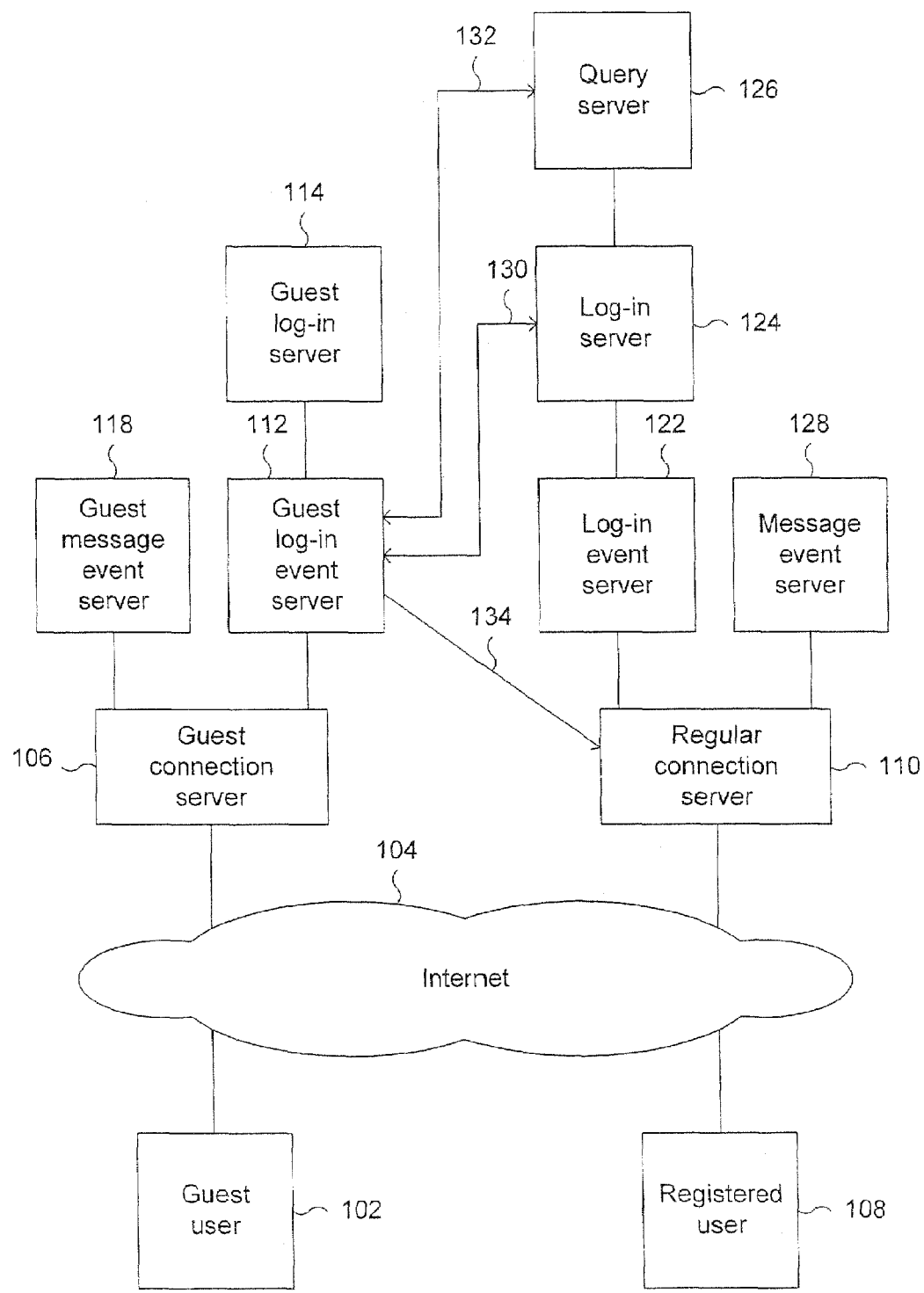
FIG. 1A is a schematic diagram illustrating an instant messaging system used in one embodiment to provide instant messaging functionality in a non-instant messaging environment.

FIG. 1A is a schematic diagram illustrating an instant messaging system used in one embodiment to provide instant messaging functionality in a non-instant messaging environment. An invited user client system 102 is connected via the Internet 104 with a guest connection server 106. In one embodiment, an invited user who is not a registered user of the instant messaging system may access and use the instant messaging system as a guest user by connecting to the guest connection server 106 to communicate by instant messaging with a registered instant messaging user, as described more fully below. As used herein, an "invited user" is one who has been invited to communicate by instant messaging with the registered instant messaging user who extended the invitation, as described more fully below. A user may be an "invited user" even if the entry point accessed by the user to initiate communication by instant messaging with the registered user who extended the invitation was not specifically directed to that user (e.g., the entry point was posted on a web page accessible by the user and other users). A registered user client system 108, such as may be used by the user who invited the invited user to communicate by instant messaging (referred to herein as the "inviting user"), is connected via the Internet 104 with a regular connection server 110.

The guest connection server 106 is connected to a guest login event server 112. In one embodiment, when an invited user indicates a desire to log in as a guest user, as opposed to as a registered user, the invited user is prompted to supply a display name and is given an opportunity to enter an initial message, as described more fully below in connection with FIGS. 3, 4, and 6. In one embodiment, a login request message comprising the display name and initial message entered by the guest user is sent from the guest user client system 102 to the guest connection server 106. Upon receipt, the login request message is forwarded to the guest login event server 112 for processing.

In one embodiment, a request to login as a guest user is only further processed if it is determined that the target registered instant messaging user with whom the guest user wishes to communicate by instant messaging (i.e., the inviting user) is logged into the instant messaging system and available to send and receive instant messages. In one embodiment, a registered user logs in by connecting to the instant messaging system via a connection server such as regular connection user 110. The regular connection server 110 is connected to a login event server 122. A request from a registered user to login is directed to a regular connection server such as regular connection server 110, which passes the request to log in to the login event server 122 for processing. In one embodiment, the login event server 122 is connected to a user profile database, not shown in FIG. 1A, which contains information concerning the registered user, such as the registered user's system preferences and data associated with the user, such as a buddy list (described below). In one embodiment, the login event server 122 uses data from the user profile database to process the request of a registered user to log in.

The login event server 122 is connected to a login server 124. In one embodiment, the login event server 122 sends a request to the login server 124 to establish a record within the login server 124 indicating that the registered user is logged in and comprising information to be used to deliver instant messages to the registered user, such as the IP address of the connection server through which the registered user has established a connection with the system and the port number being used on the connection server to communicate with the registered user's client system.

The login server 124 is connected to a query server 126. In one embodiment, the query server 126 handles routine requests for connection information regarding the registered users currently logged in to the system. In one embodiment, a copy of the record established for a registered user in the login server 124 upon login is sent to the query server 126 at the time of login and is deleted from the query server 126 and the login server 124 when the registered user logs off. In one embodiment, the record in login server 124 associated with a particular registered user may be updated more frequently during the time during which the registered user is logged in, but the query server 126 does not receive each such update so long as the update does not affect the identification and connection information associated with the registered user.

Returning to consideration of the log in process for a guest user, when the guest login event server 112 receives a request to log in as a guest user, it assigns to the guest user a randomly generated guest user identification. The guest login event server then queries the query server 126 via a connection 132 to verify that the target registered user with whom the guest user has indicated a desire to communicate by instant messaging is logged in. The connection 132 may be a physical connection, such as a cable, or a logical connection, such as a network or other connection that enables the two servers to exchange data. In one embodiment, if the registered user is not logged in, the request to log in as a guest user is not further processed and an error message is returned to the guest user.

The guest login event server 112 is connected to a guest login server 114. If the guest login event server determines that the registered user is logged in, the guest login event server 112 sends a request to the guest login server 114 to establish a login record for the guest user in the guest login server 114. In one embodiment, the record indicates that the guest user is logged in, associates the guest user identification with the guest user, and comprises information needed to deliver an instant message to the guest user, such as the IP address of the guest connection server through which the guest user has connected to the system and the port number being used on the guest connection server to communicate with the guest user's client system.

The guest login event server 112 is connected to the query server 126 by connection 132. The connection 132 may be a physical connection, such as a cable, or a logical connection, such as a network or other connection that enables the two servers to exchange data. In one embodiment, preparatory to sending the initial message included in the guest user's request to log in, the guest login event server 112 queries the query server 126 via connection 132 to obtain the connection information needed to deliver the initial message to the target registered user for whom it is intended. In one embodiment, the information so obtained from the query server 126 comprises the IP address of the connection server through which the registered user is connected to the instant messaging system and the port number being used by the connection server to communicate with the target registered user's client system.

The guest login event server 112 is connected to the regular connection server 110 via connection 134. The connection 134 may be a physical connection, such as a cable, or a logical connection, such as a network or other connection that enables the two servers to exchange data. In one embodiment, once the guest login event server 112 has obtained from the query server 126 the connection information for the target registered user, the guest login event server 112 uses that information to send the initial message included in the guest user's login request to the target registered user via connection 134 and regular connection server 110.

The guest connection server 106 is connected to a guest message event server 118, which processes subsequent messages received from the guest user as described below in connection with FIG. 1B. The regular connection server 110 is connected to a message event server 128, which processes messages received from the registered user as described below in connection with FIG. 1B.

In one embodiment, the respective functions of the guest connection server and the regular connection server are performed by a single connection server and no separate or dedicated connection server is provided to handle guest users. In one embodiment, the guest connection server 106 shown in FIG. 1A may be one of a plurality of guest connection servers, each configured to provide the functionality described as being provided by the guest connection server 106. In one embodiment, the regular connection server 110 shown in FIG. 1A may be one of a plurality of connection servers, each configured to provide the functionality described as being provided by the regular connection server 110. In one embodiment, all of the functions described above are performed by a single system, without providing separate systems or modules to provide the functionality described above. The functionality described above may be divided among one or more systems in the manner described above or in any number of different combinations, depending on the needs and resources available in any particular implementation.

The schematic diagram in FIG. 1A does not show all of the logical or other connections between the components associated primarily with the guest user (comprising elements 102, 106, 112, 114, and 118), on the one hand, and the components associated primarily with the registered user (comprising elements 108, 110, 122, 124, 126, and 128), on the other hand, and instead shows only those logical or other connections involved in the processing of logging in and sending the initial message from the guest user to the registered user. The sending and receipt of subsequent messages is discussed immediately below in connection with FIG. 1B.

Figure 1B:
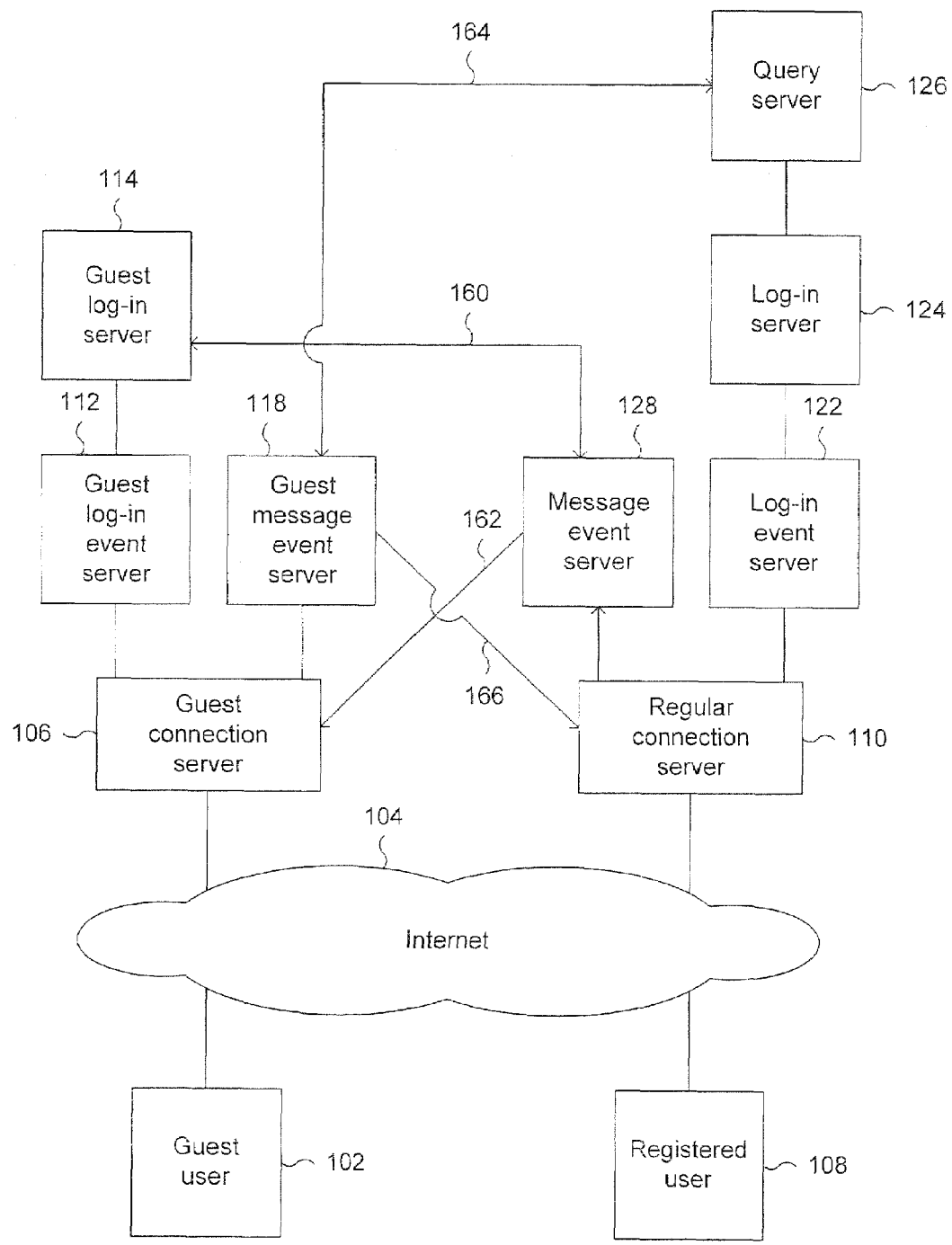
FIG. 1B shows the system components illustrated in FIG. 1A with the same reference numerals being used in FIG. 1B as in FIG. 1A to indicate like components.

FIG. 1B shows the system components illustrated in FIG. 1A with the same reference numerals being used in FIG. 1B as in FIG. 1A to indicate like components. The relative position of certain of the components has been changed to facilitate the clear illustration of certain connections relevant to the processing of messages sent by an invited user to an inviting user subsequent to the initial message included with the invited user's login request, as described above, and messages sent from the inviting user to the invited user. As in FIG. 1A, not all logical or other connections between components associated primarily with the invited user, on the one hand, and components associated primarily with the inviting user, on the other hand, are shown in FIG. 1B. Instead, only those connections are shown that play a role in the sending of messages from the invited user to the inviting user (subsequent to the initial message) or the sending of messages from the inviting user to the invited user.

To send an instant message to an invited who is not a registered user of the instant messaging system, and who has therefore logged in as a guest user, the inviting user enters the message in the message entry area of an instant messaging window displayed at the registered user client system 108 and selects a "send" option. The client side instant messaging application program installed on the registered user client system 108 sends the message to the regular connection server 110 via the Internet 104. The regular connection server 110 passes the message to the message event server 128 for processing. The message event server 128 queries the guest login server 114 via a connection 160 to obtain connection information necessary to deliver the message to the guest user. The connection 160 may be a physical connection, such as a cable, or a logical connection, such as a network or other connection that enables the two servers to exchange data. In one embodiment, if connection information is not available from the guest login server 114, the message event server 128 is configured to recognize that the guest user is no longer logged in and returns an error message to the registered user indicating that the message could not be delivered because the guest user has logged off.

If the message event server 128 successfully obtains connection information for the guest user, the message event server uses the connection information to deliver the message to the guest user via a connection 162 to the guest connection server 106. The connection 162 may be a physical connection, such as a cable, or a logical connection, such as a network or other connection that enables the two servers to exchange data. The message is then delivered by the guest connection server 106 to the invited user client system 102 via the Internet 104, and is displayed to the guest user at the invited user client system 102.

To send a subsequent message (i.e., subsequent to the initial message included with the guest user's login request) to the inviting user, the guest user enters the message in a message entry area displayed at the invited user client system 102. In one embodiment, the instant messaging user interface displayed at the invited user client system 102 is provided by a browser-executable instant messaging client, as described more fully below. The invited user client system 102 sends the message to the guest connection server 106 via the Internet 104. The guest connection server passes the message to the guest message event server 118 for processing. The guest message event server 118 queries the query server 126, via a connection 164, to obtain connection information necessary to deliver the message to the registered user. The connection 164 may be a physical connection, such as a cable, or a logical connection, such as a network or other connection that enables the two servers to exchange data.

In one embodiment, if connection information is not available from the query server 126, the guest message event server 118 is configured to recognize that the inviting user is no longer logged in and returns an error message to the guest user indicating that the message could not be delivered because the registered user has logged off.

If the guest message event server 118 successfully obtains connection information for the inviting user, the guest message event server uses the connection information to deliver the message to the inviting user via a connection 166 to the regular connection server 110. The connection 166 may be a physical connection, such as a cable, or a logical connection, such as a network or other connection that enables the two servers to exchange data. The message is then delivered by the regular connection server 110 to the registered user client system 108 via the Internet 104, and is displayed to the registered user at the registered user client system 108.

Figure 2:
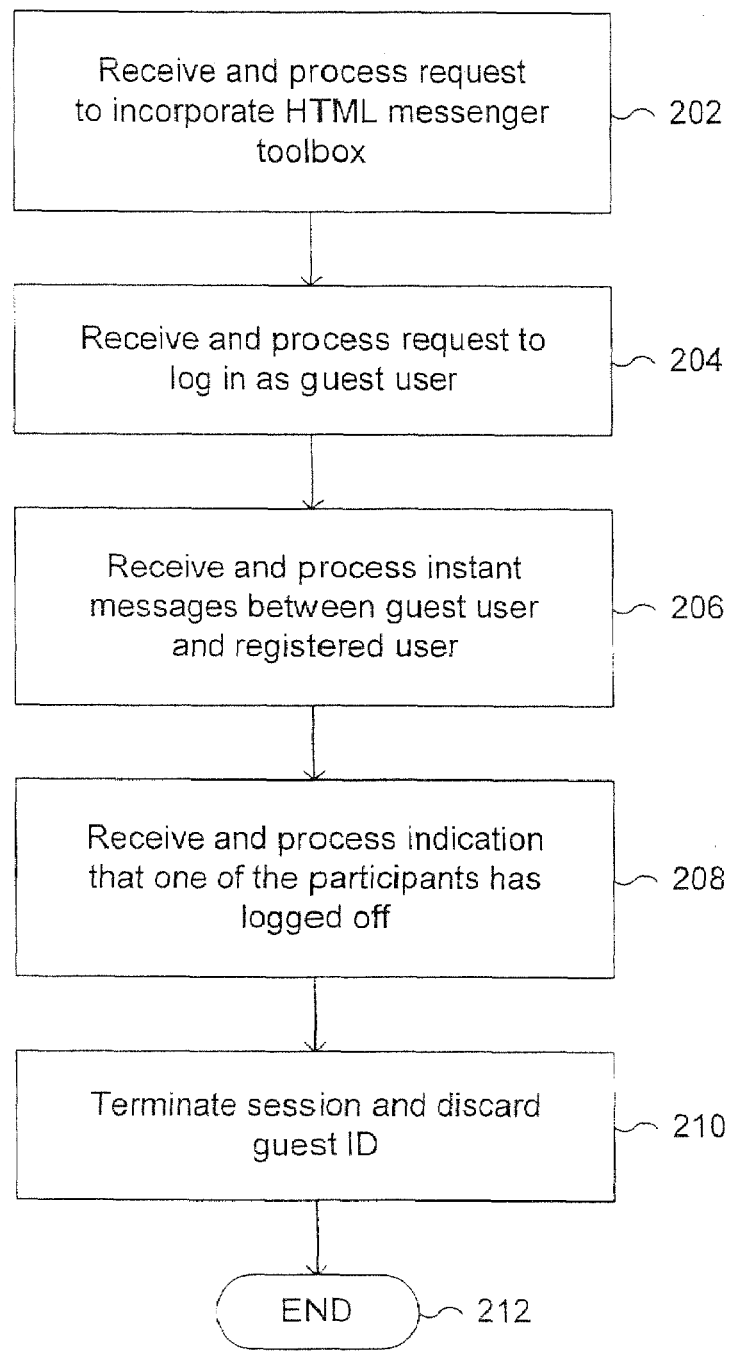
FIG. 2 is a flowchart illustrating a process used in one embodiment to provide instant messaging functionality in a non-instant messaging environment.

FIG. 2 is a flowchart illustrating a process used in one embodiment to provide instant messaging functionality in a non-instant messaging environment. The process begins at step 202 in which a request to incorporate an instant messenger toolbox comprising computer code written in the hyper text markup language (HTML) is received. In one embodiment, as described more fully below, such an indication may be received from a user composing an electronic mail message. In one embodiment, a request may be received to incorporate an HTML messenger toolbox and any web page, message, or other electronic document that is based on or supports HTML. In one alternative embodiment, the toolbox is provided using computer code written in a computer programming language other than HTML. Any computer code that is executable by application software associated with the electronic communication or other document in which the toolbox is embedded may be used.

Figure 3:
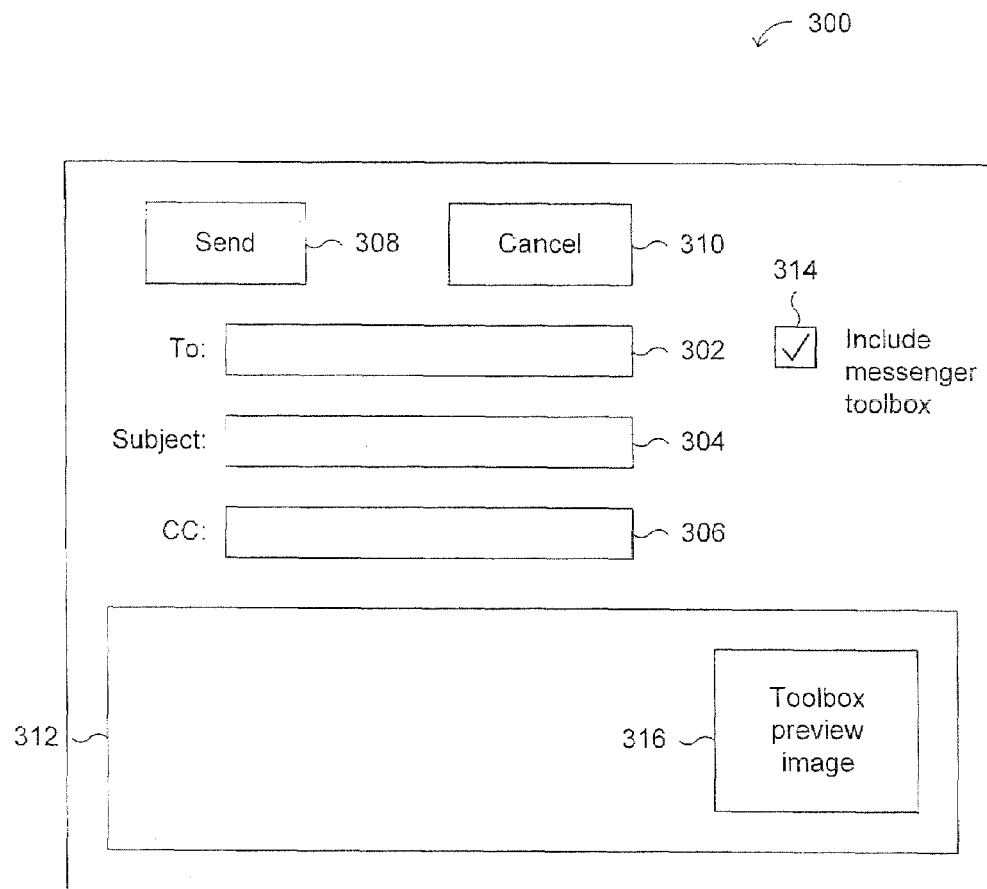
FIG. 3 is an illustration of an electronic mail message composition page 300 that may be used in one embodiment to request that an HTML messenger toolbox be incorporated in an outgoing electronic mail message.

FIG. 3 is an illustration of an electronic mail message composition page 300 that may be used in one embodiment to request that an HTML messenger toolbox be incorporated in an outgoing electronic mail message. In one embodiment, if requested the toolbox is included in the outgoing electronic mail message when the message is sent to the recipient to whom it is addressed. The electronic mail message composition page 300 comprises a "to" field 302, a "subject" field 304, and a "cc:" field 306 in which addressing and subject information for the electronic mail message may be entered by the user composing the message. The composition page 300 further includes a "send" button 308 to be used by the user composing the message to indicate that the message is complete and ready to be sent to the recipient(s) to whom it is addressed. The message composition page 300 also includes a "cancel" button 310 which may be used to cancel a request to prepare and send an electronic mail message and to exit the electronic mail composition page. The electronic mail message composition page 300 further comprises a message text entry area 312, which may be used by the user composing the message to enter the text of the message. The electronic mail message composition page 300 further includes an instant messenger toolbox insertion request check box 314. In one embodiment, when the check box 314 is selected, a check mark appears in the box (as shown in FIG. 3) and a toolbox preview image 316 is displayed in the message text entry area 312. In one embodiment, an image of the messenger toolbox, as it will appear in the message when sent, is displayed in the message text area 312 to show the user composing the message how the toolbox will appear when displayed to the recipient as part of the message. In one embodiment, an image of the toolbox as opposed to the actual HTML toolbox itself is inserted in the mail message composition page to prevent the user composing the message from inadvertently altering the HTML code that will be used to provide the toolbox as part of the message as received. If the check box 314 is not selected, or is de-selected, no check mark appears in the check box and no toolbox preview image appears in the message text entry area 312.

Figure 4:
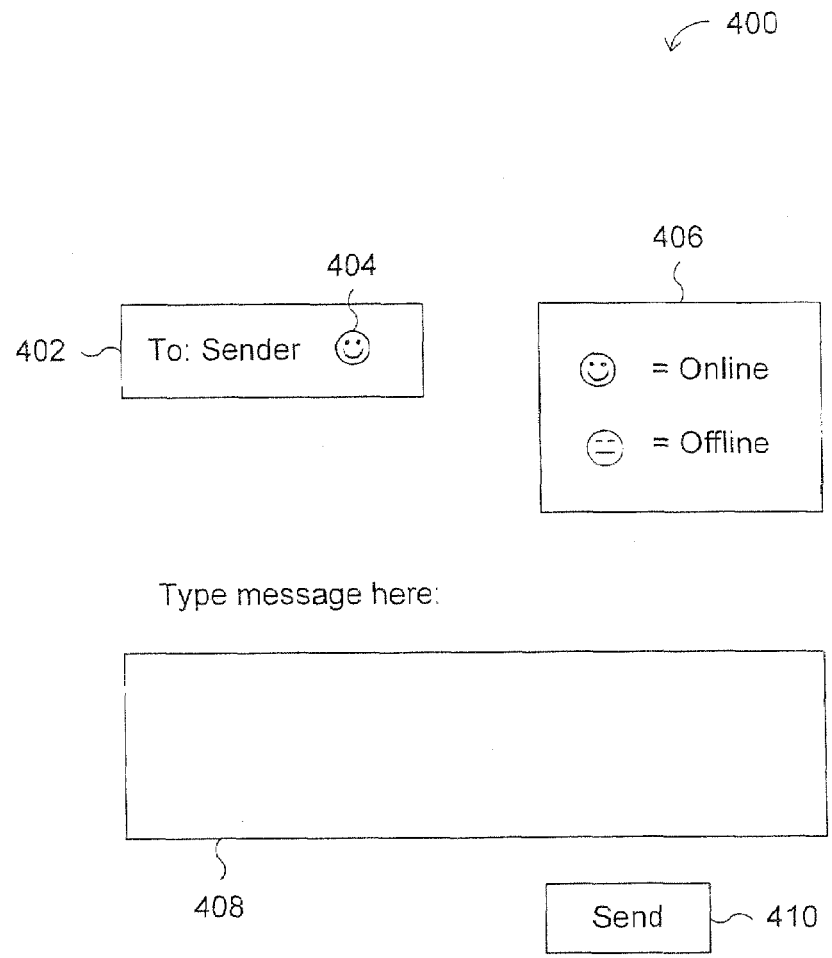
FIG. 4 is an illustration of an HTML messenger toolbox 400 used in one embodiment as an entry point to enable an invited user to communicate with a registered instant messaging user by means of an instant messaging system that would have otherwise have required the invited user to download and install client side instant messaging application software and to register as an instant messaging user, if the invited user had not previously done so.

FIG. 4 is an illustration of an HTML messenger toolbox 400 used in one embodiment as an entry point to enable an invited user to communicate with a registered instant messaging user by means of an instant messaging system that would have otherwise have required the invited user to download and install client side instant messaging application software and to register as an instant messaging user, if the invited user had not previously done so. An image of an HTML messenger toolbox such as the messenger toolbox 400 shown in FIG. 4 would be displayed, if requested by the inviting user, in one embodiment in the toolbox preview image display area 316 of FIG. 3. The exemplary HTML messenger toolbox 400 comprises an inviting instant messaging user information display area 402. In one embodiment, as shown in FIG. 4, the inviting instant messaging user information area 402 comprises a user name or identification for the inviting user. In the example shown in FIG. 4, the inviting instant messaging user is identified as "sender", which in this example refers to the sender of an electronic mail message such as might be sent through use of an electronic message composition page such as the electronic mail message composition page 300 of FIG. 3. The inviting instant messaging user information area 402 further comprises an on line presence indicator 404. In one embodiment, the on line presence indicator 404 is used to signal to a recipient or other viewer of the HTML messenger toolbox whether or not the inviting instant messaging user associated with the toolbox is presently signed in to the instant messaging system, thereby making it possible for the person viewing the HTML messenger toolbox to communicate with the inviting instant messaging user at the present time through instant messaging. The HTML messenger toolbox 400 further comprises an on line presence indicator key display area 406 in which a key to the on line presence indicators is provided. In the example shown in FIG. 4, a smiling face indicator indicates that the inviting instant messaging user associated with the HTML messenger toolbox is on line and signed in to the instant messaging system, and an image of a face that suggests sleep, with flat horizontal lines representing the eyes and mouth, is used to indicate that the inviting instant messaging user associated with the HTML messenger toolbox is off line and is not available to participate in an instant messaging session. The exemplary HTML messenger toolbox 400 shown in FIG. 4 further comprises an initial message text entry area 408 in which an individual wishing to communicate with the inviting instant messaging user associated with the HTML messenger toolbox may enter an initial message to the inviting user. The HTML messenger toolbox 400 also comprises a "send" button 410. In one embodiment, selection of the "send" button 410 causes a browser pop up window to open and be connected via the Internet to a web page comprising computer code written in one or more browser-executable programming languages to provide limited instant messaging functionality, as described more fully below.

Figure 5:
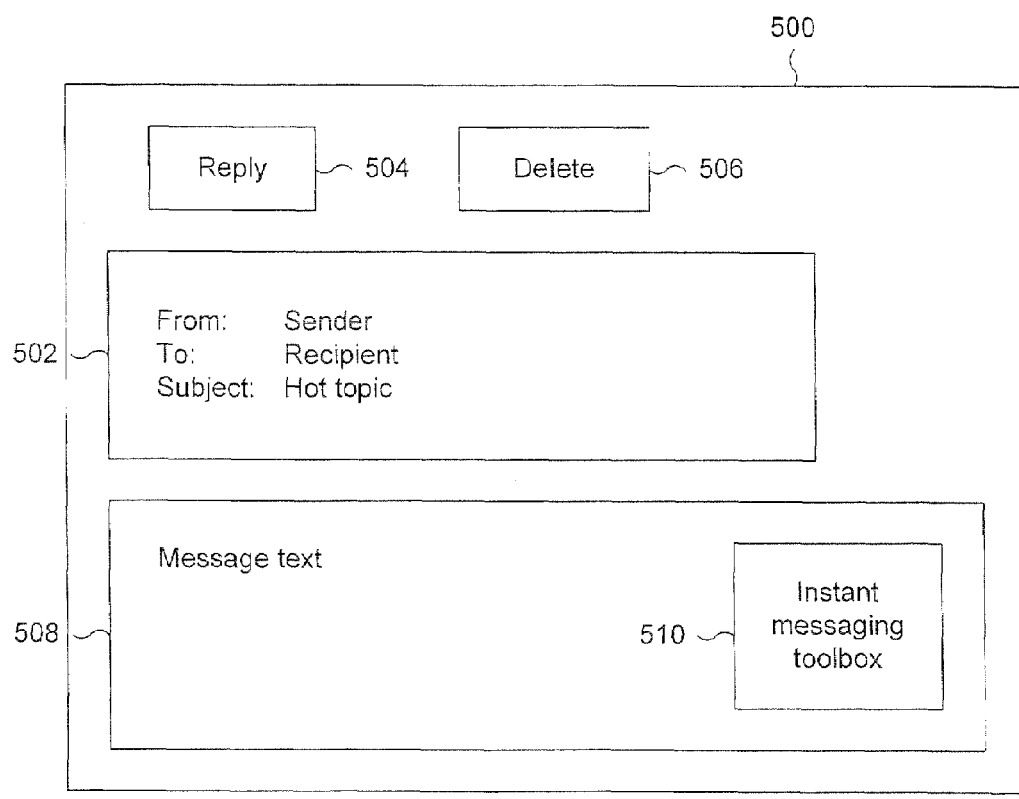
FIG. 5 is an illustration of an exemplary electronic mail message comprising an instant messaging toolbox such as the HTML messenger toolbox illustrated in FIG. 4.

FIG. 5 is an illustration of an exemplary electronic mail message comprising an instant messaging toolbox such as the HTML messenger toolbox illustrated in FIG. 4. The electronic mail message display 500 comprises a header information display area 502 in which address information and subject matter information may be displayed. The message display 500 further comprises a "reply" button 504 which may be used by the recipient of the message to send a reply electronic mail message to the sender of the original message by opening an electronic mail message composition page or display that is pre-addressed to the sender of the original message. The message display 500 further comprises a "delete" button 506 which may be used by the recipient to delete the electronic mail message from the recipient's in box. The message display 500 further comprises a message text display area 508 in which the text of the sender's message is displayed. In one embodiment, if the sender of the message (i.e., the inviting user) has indicated that an instant messaging toolbox such as the HTML messenger toolbox described above should be included with the message as delivered to the recipient, an instant messaging toolbox 510 is provided as part of the message and displayed within the message text display area 508. In one embodiment, the instant messaging toolbox 510 is the HTML messenger toolbox 400 described above and illustrated in FIG. 4.

Returning to the process illustrated in FIG. 2, the process continues with step 204 in which a request to log in as a guest user of the instant messaging system is received and processed. In one embodiment, as described above, the HTML messenger toolbox is used by a would be guest user of the instant messaging system to indicate that the guest user wishes to communicate by instant messaging with the registered instant messaging user associated with the messenger toolbox, as described more fully below.

In step 206 of the process shown in FIG. 2, instant messages from the guest user to the registered user and instant messages from the registered user to the guest user are received by the instant messaging system and processed. In one embodiment, the processing includes delivery of the instant messaging message to the intended recipient. The receipt and processing of instant messages is described more fully below in connection with FIGS. 11 and 13.

In step 208 of the process shown in FIG. 2, an indication that one of the participants has logged off is received and processed. In one embodiment, the instant messaging system receives such an indication if a participant either selects a "sign off" button or option in the participant's instant messaging display window or if the participant closes the participant's instant messaging display window. In one embodiment, a registered user does not sign off when he or she closes an instant messaging window associated with a particular instant messaging session (or "conversation"), and such a user must instead take other steps to sign off. In one embodiment, the processing performed in step 208 comprises informing the other participant(s) that a participant has logged off. The processing performed in step 208 is described more fully below in connection with FIG. 14.

In step 210 of the process shown in FIG. 2, the instant messaging session between the guest user and the registered user is terminated and the temporary guest user ID assigned to the guest user is discarded and no longer associated with the guest user. The process shown in FIG. 2 ends in step 212.

Figure 6:
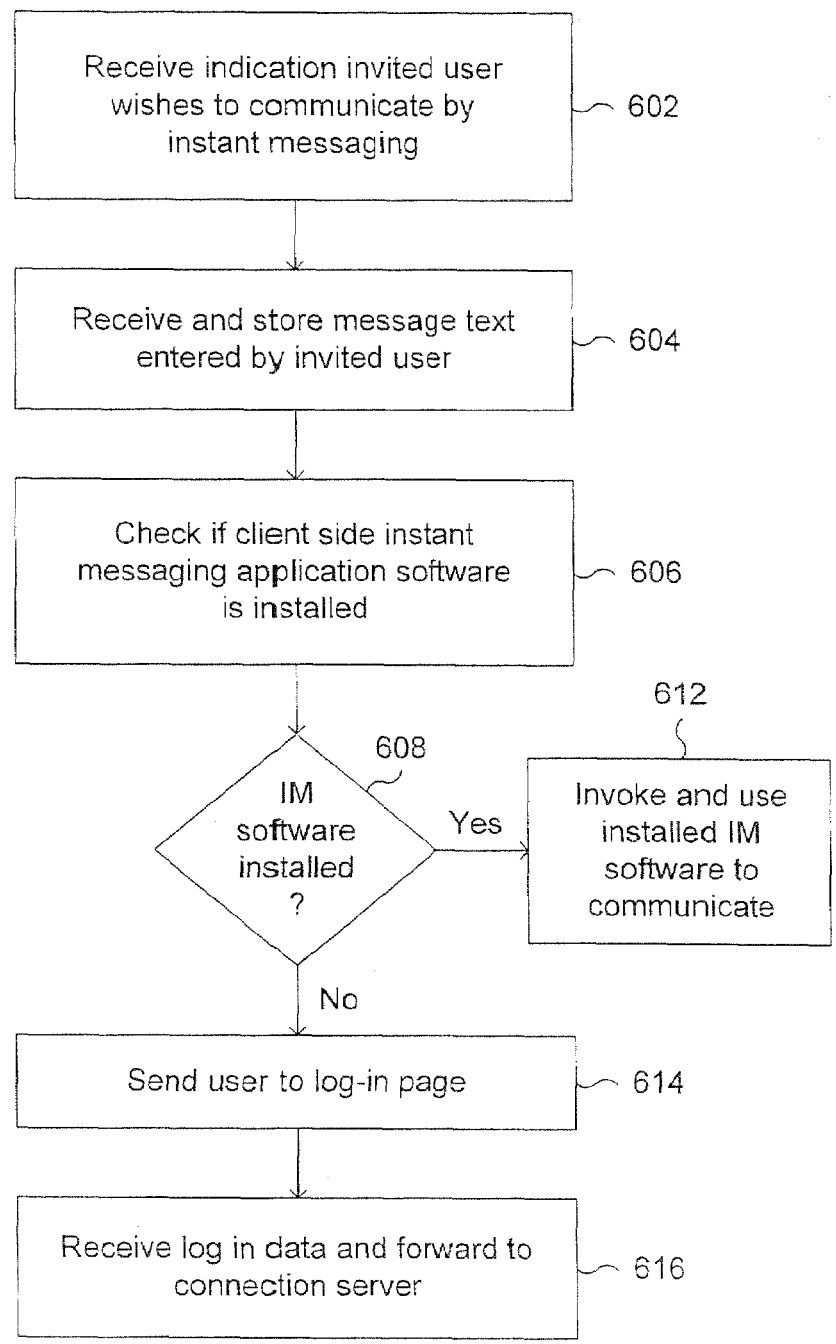
FIG. 6 is a flowchart illustrating the processes executed in one embodiment at the client system of an invited user of an instant messaging system to enable the invited user to initiate an instant messaging session.

FIG. 6 is a flowchart illustrating the processes executed in one embodiment at the client system of an invited user of an instant messaging system to enable the invited user to initiate an instant messaging session. The process begins with step 602 in which an indication is received from the user that the user wishes to communicate by instant messaging. At the invited user's client system, this indication is received in one embodiment by an HTML messenger toolbox, such as the HTML messenger toolbox described above and illustrated in FIG. 4. In one embodiment, the indication is received upon selection of the invited user of a "send" button such as the "send" button 410 of FIG. 4.

In step 604 of the process shown in FIG. 6 the message text of the initial message entered by the invited user is received and stored locally. In one embodiment, the initial message text is the text entered by the invited user in an initial message text entry area, such as the initial message text entry area 408 of FIG. 4.

In one embodiment, upon completion of steps 602 and 604, the HTML messenger toolbox causes a browser pop up window to open and to be connected via the Internet to an instant messaging client page configured to provide limited instant messaging functionality, as described more fully below. In one embodiment, the instant messaging client page comprises a browser-executable instant messaging client. In one embodiment, the browser-executable instant messaging client is provided at least in part by computer code written in the Dynamic HyperText Markup Language (DHTML). In one embodiment, DHTML is used to control the layout and appearance of the browser-executable instant messaging client, JavaScript is used to manipulate the HTML dynamically, and a Java Applet is used to manage the network interface. In other embodiments, other programming languages and tools may be used. In one embodiment, for example, the instant messaging functionality described herein may be provided by a browser-executable instant messaging client implemented using JavaScript and HTTP. In one embodiment, ActiveX is used. In such an embodiment, the ActiveX control must be downloaded and installed by the guest user before the instant messaging client may be used. In one embodiment, Flash is used in conjunction with an XML stream.

In one embodiment, in step 606 of the process shown in FIG. 6, the browser-executable instant messaging client checks to determine if the client side instant messaging application software is installed on the invited user's client system. In one embodiment, JavaScript code is used by the instant messaging client to determine if the instant messaging software is installed.

In step 608, it is determined if the client side instant messaging application software has been found on the invited user's client system. If the client side instant messaging application software has been found on the client system, the process proceeds to step 610 in which the installed client side instant messaging application software is invoked to enable the invited user to sign in as a registered user and communicate with the invited user associated with the HTML messenger toolbox in a regular instant messaging session. In one embodiment, the user name or identification of the inviting user associated with the HTML messenger toolbox is passed to the invited user's installed client side instant messaging application software to enable the software to establish an instant messaging session with the inviting user associated with the instant messenger toolbox. In one embodiment, the initial message entered by the invited user in the message text entry area of the HTML messenger toolbox is passed to the installed client side instant messaging application software to enable that text to be passed as an initial message to the inviting user associated with the HTML messenger toolbox in the regular instant messaging session that will be initiated by the installed instant messaging application software. If the instant messaging application software for the instant messaging system is found to be installed on the client system of the invited user, the invited user logs in not in the manner described above for a "guest user", but rather as a registered user, like the inviting user.

If it is determined in step 608 that the client side instant messaging application software has not been found on the invited user's client system, the process proceeds to step 614 in which the browser-executable instant messaging client displays a streamlined login page to the invited user to enable the invited user to log in as a guest user.

Figure 7:
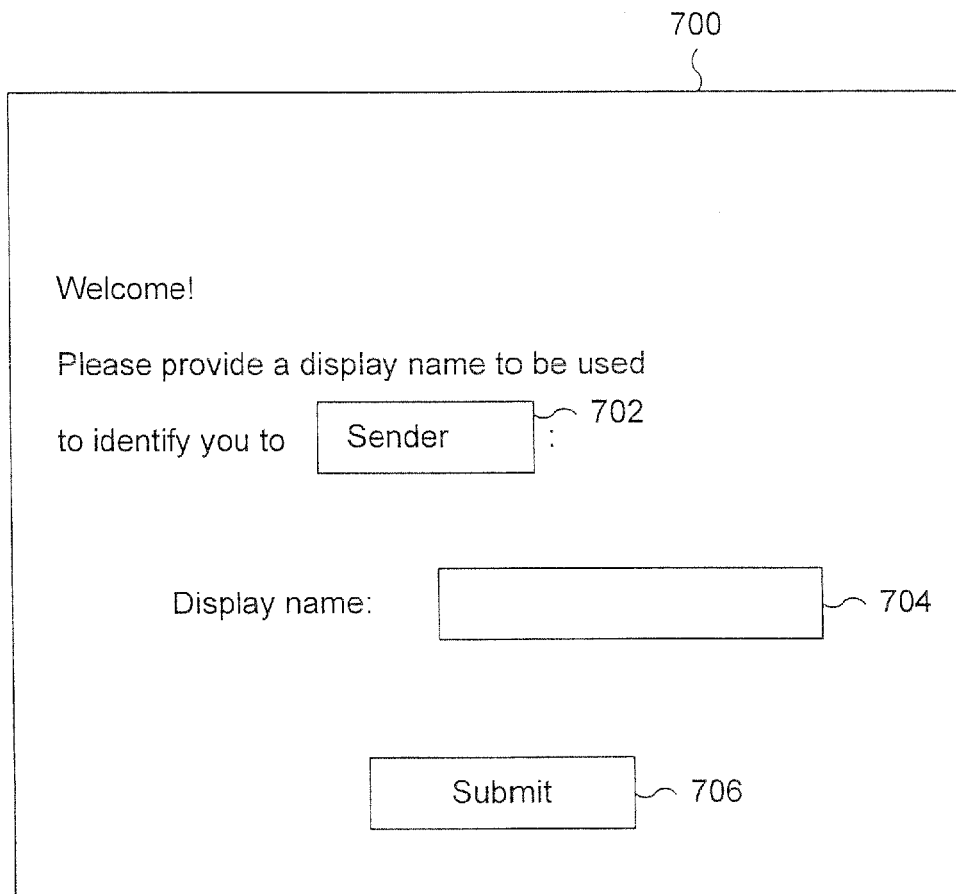
FIG. 7 is an illustration of a log in page used in one embodiment to obtain a display name to be used for the invited user in an instant messaging session to be established between the invited user, logging in as a guest user, and the inviting instant messaging user associated with the HTML messenger toolbox.

FIG. 7 is an illustration of a log in page used in one embodiment to obtain a display name to be used for the invited user in an instant messaging session to be established between the invited user, logging in as a guest user, and the inviting instant messaging user associated with the HTML messenger toolbox. The exemplary log in page 700 comprises an inviting user identification display area 702 in which information identifying the inviting user associated with the HTML messenger toolbox is displayed. In the example shown in FIG. 7, the user name "sender" is displayed in the display area 702, indicating that "sender" is the inviting instant messaging user associated with the HTML messenger toolbox invoked by the guest user. As shown in FIG. 7, in one embodiment the login display 700 comprises instructions to the guest user on how to establish the instant messaging session. The login display 700 further comprises a display name entry area 704 to be used by the guest user to enter a display name by which the guest user will be identified to the other participant(s) in the instant messaging session. The login display 700 further comprises a "submit" button 706, which the guest user may select after entering a display name to submit the display name to the instant messaging connection server for processing.

Referring further to FIG. 6, in step 616 login data is received and forwarded to the instant messaging connection server. In one embodiment, the log in page shown in FIG. 7 is used and the login data entered by the guest user is received by the browser-executable instant messaging client and forwarded by the browser-executable instant messaging client to the instant messaging connection server upon selection of the submit button 706 by the guest user.

In one embodiment, the instant messaging system is associated with a broader subscriber-based system in which some but not all of the subscribing users have downloaded and installed the client side instant messaging application software and have registered as instant messaging users. In one embodiment, subscribers may sign in to the on line service for purposes of receiving other services such as electronic mail and personalized calendar, news, and/or other services. In one such embodiment, the process shown in FIG. 6 is modified such that prior to sending a guest user to a log in page, as in step 614 of the process shown in FIG. 6, the browser-executable client checks to see if the guest user is a subscriber to the on line service who has not installed the instant messaging software associated with the on line service but who has subscribed to and is presently signed in to the broader on line service. In one such embodiment, if it is determined that the guest user has signed to the broader on line service, the user and/or display name associated with the subscriber is used as the guest user's display name for purposes of the instant messaging session to be established with the registered instant messaging user associated with the HTML messenger toolbox and step 614 of FIG. 6 is omitted.

In one alternative embodiment, the guest user is not prompted to provide a display name and the temporary user identification assigned by the connection server, as described more fully below, is used to identify the guest user. In such an embodiment, steps 614 and 616 of FIG. 6 are omitted and the browser-executable client merely requests a temporary guest user identification from the connection server, without prompting the guest user to provide a display name, if it is determined that the instant messaging application software is not installed on the guest user's client system.

Figure 8:
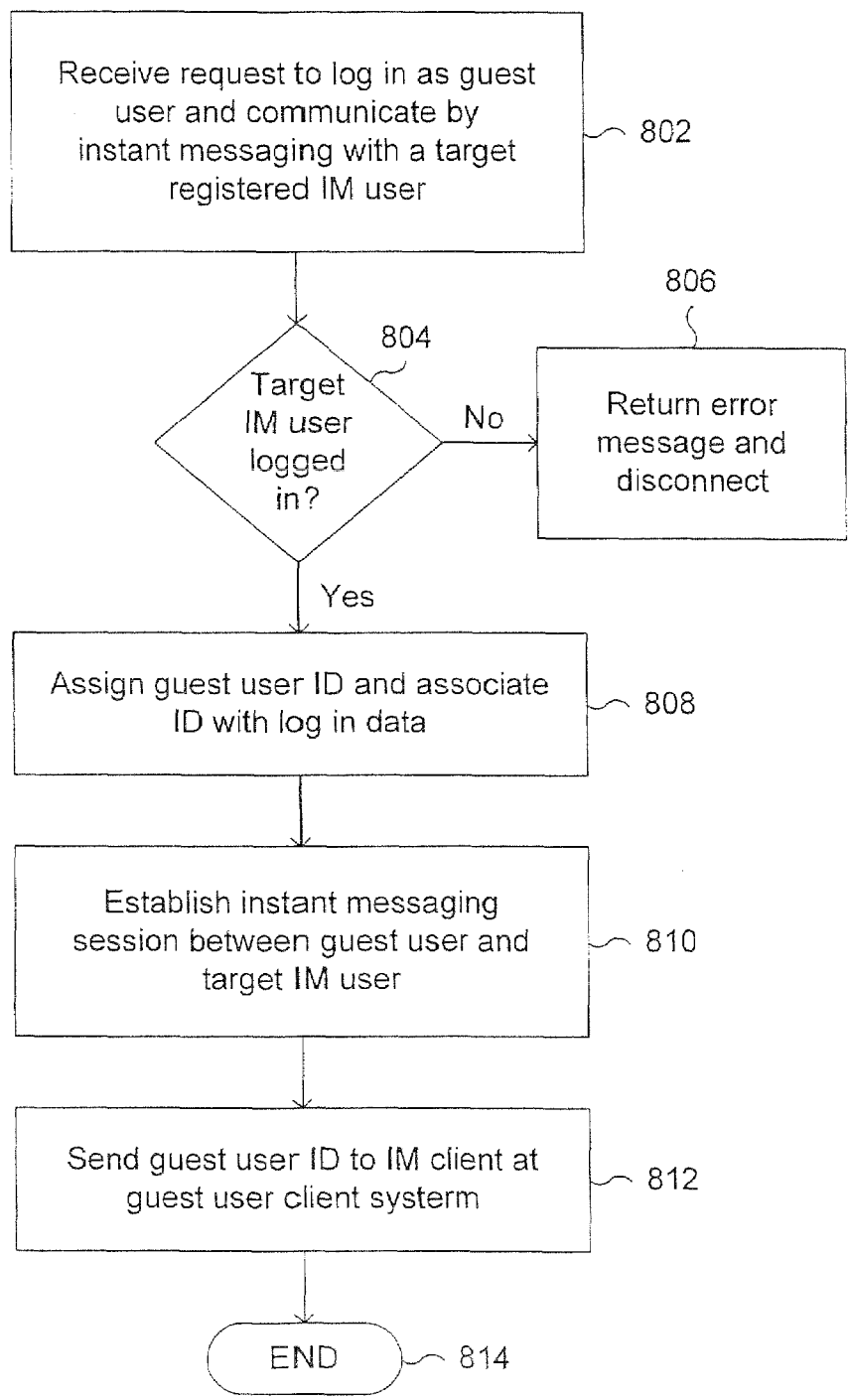
FIG. 8 is a flowchart of a process executed in one embodiment at the instant messaging connection server to process a request from an invited user to log in as a guest user, as in step 204 of FIG. 2.

FIG. 8 is a flowchart of a process executed in one embodiment at the instant messaging connection server to process a request from an invited user to log in as a guest user, as in step 204 of FIG. 2. In step 802, the connection server receives a request to log in as a guest user and communicate by instant messaging with an inviting instant messaging user. In one embodiment, the request comprises an identification of the client system being used by the guest user. In one embodiment, the identification comprises an Internet protocol (IP) address and port number associated with the client system being used by the guest user. In one embodiment, the request further comprises an identification of the inviting instant messaging user associated with the HTML toolbox initially invoked by the guest user. In one embodiment, the request comprises a display name entered by the guest user in a display name entry area such as entry area 704 of FIG. 7. In one embodiment, the request to log in is sent by the browser-executable client to the connection server.

In step 804 of the process shown in FIG. 8, it is determined whether the inviting instant messaging user is currently logged in to the instant messaging system. If it is determined in step 804 that the inviting instant messaging user is not logged in to the instant messaging system, the process proceeds to step 806 in which an error message is returned to the client system being used by the guest user and the guest user is disconnected from the connection server. If it is determined in step 804 that the inviting instant messaging user is currently logged in to the instant messaging system and, therefore, is available to participate in an instant messaging session with the requesting guest user, the process proceeds to step 808 in which the guest event server assigns a guest user identification to the guest user and associates the guest user identification with the guest user and the guest user's login data. In one embodiment, the guest user identification assigned to the guest user is valid only for instant messaging communication with the inviting instant messaging user, that is the registered instant messaging user associated with the HTML messenger toolbox initially invoked by the guest user. In one embodiment, the guest login server is configured to ensure that only three guest user identifications may be associated with any IP address at a given time, as a protection against the guest user feature being used inappropriately, such as to send large amounts of unwanted and unsolicited messages to one or more inviting instant messaging users.

In step 810 of the process shown in FIG. 8, an instant messaging session is established by the connection server between the guest user and the inviting instant messaging user. In one embodiment, establishing the instant messaging session comprises associating the guest user identification with the inviting user's identification and assigning an instant messaging session identifier to the instant messaging session between the guest user and the inviting user. In one embodiment, this information is used by the guest login server to ensure that messages received from the guest user and the inviting user are processed correctly.

In step 812 of the process shown in FIG. 8, the guest user identification assigned to the guest user is sent by the connection server to the browser-executable instant messaging client at the guest user instant messaging client at the guest user's client system. The log in process ends in step 814.

Figure 9:
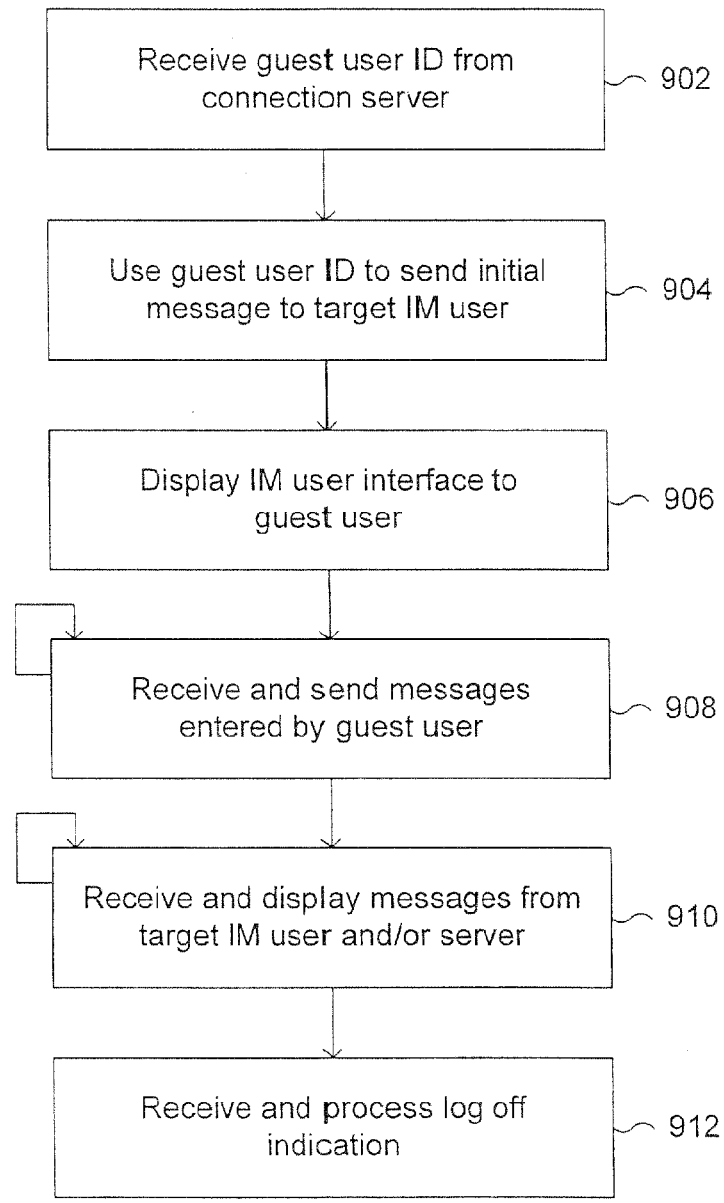
FIG. 9 is a flowchart illustrating a process executed in one embodiment by the browser-executable client at the invited user's client system to send and receive instant messages between the invited user and the registered user associated with the HTML messenger toolbox when the invited user has logged in as a guest user.

FIG. 9 is a flowchart illustrating a process executed in one embodiment by the browser-executable client at the invited user's client system to send and receive instant messages between the invited user and the registered user associated with the HTML messenger toolbox when the invited user has logged in as a guest user. In step 902, the browser-executable client receives the guest user identification assigned and sent by the connection server. In step 904, the guest user identification assigned by the connection server is used to send the initial instant messaging message entered by the guest user in the HTML messenger toolbox, as described above to the inviting instant messaging user.

In step 906, an instant messaging user interface is displayed to the guest user.

In step 908, instant messages entered by the guest user in the message entry area of the instant messaging user interface displayed in step 906 are received and sent by the browser-executable client as instant messages addressed to the inviting instant messaging user associated with the HTML messenger toolbox. As shown in FIG. 9, this is repeated whenever the guest user enters and submits a new message.

In step 910 of the process shown in FIG. 9, the browser-executable client receives and displays to the guest user instant messages received from the inviting instant messaging user associated with the HTML messenger toolbox invoked by the guest user and/or messages received from the instant messaging connection server. As shown in FIG. 9, the step 910 is repeated each time a new message is received.

In step 912, the browser-executable client receives and processes an indication that a participant in the instant messaging session has logged off. If the participant logging off is the guest user, the indication is received in one embodiment when the guest user selects a log off option in the instant messaging display. In one embodiment, the indication is received when the guest user selects an option to close the instant messaging window. If the participant logging off is the guest user, the browser-executable client sends an indication to the connection server that the guest user has logged off. If, on the other hand, the participant logging off is the inviting instant messaging user, the browser-executable client receives an indication that the inviting user has logged off in the form of a message received from the connection server. If the browser-executable client receives such an indication from the connection server that the inviting instant messaging user has logged off, the browser-executable client displays to the guest user a message indicating that the inviting instant messaging user has logged off. In one embodiment, the browser-executable client is configured to disable the sending of any further messages by the guest user once an indication has been received that the inviting user has logged off. In one alternative embodiment, the browser-executable client is not so configured and the guest message server is instead configured to disallow the sending of any further messages by the guest user once an indication has been received that the inviting user has logged off.

Figure 10:
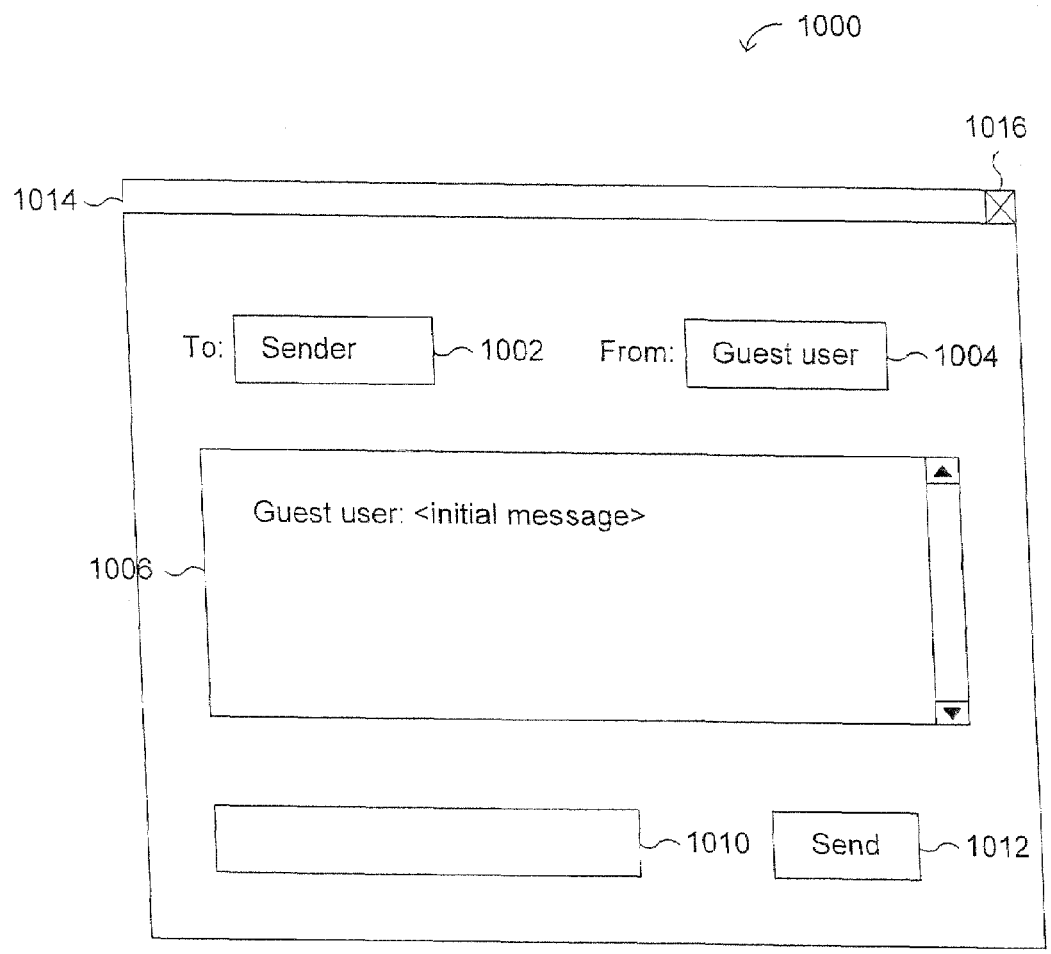
FIG. 10 is an illustration of an exemplary guest user instant messaging user interface display 1000 provided to a guest user in one embodiment, as in step 906 of FIG. 9.

FIG. 10 is an illustration of an exemplary guest user instant messaging user interface display 1000 provided to a guest user in one embodiment, as in step 906 of FIG. 9. The display 1000 comprises a target recipient identification display area 1002 in which information identifying the inviting instant messaging user is displayed. In the example shown in FIG. 10, the inviting instant messaging user is identified as "sender" to indicate the fictitious sender of an electronic mail message incorporating an HTML messenger toolbox such as the one shown in FIG. 4. The display 1000 further comprises a guest user identification display area 1004 in which the guest user identification may be displayed. In one embodiment, the guest user identification assigned by the connection server is displayed. In one embodiment, the display name provided by the guest user is displayed. In one embodiment, both the guest user identification and the display name are displayed.

The display 1000 further comprises a message text display area 1006 in which messages sent by the various participants of the instant messaging session, and/or by the instant messaging system, are displayed. As shown in FIG. 10, the first message displayed in the display area 1006 is the initial message entered by the guest user in the initial message entry area of the HTML messenger toolbox. Subsequent messages would be displayed in the order in which they are sent, each message being associated with its sender. The message display area 1006 comprises a scroll bar control 1008 which may be used in the well known manner to scroll up or down to see message text that is not currently displayed in the message display area 1006.

The display 1000 further comprises a message entry area 1010 in which the guest user may enter the text of the message the guest user wishes to send to the inviting instant messaging user. The display 1000 further comprises a "send" button 1012, which the guest user may select to submit the text entered in the message entry area 1010 for processing and transmission to the inviting instant messaging user.

The display 1000 further comprises an instant messaging display window control bar 1014, which control bar comprises a close window control button 1016. In one embodiment, selection of the close window control button 1016 provides an indication to the browser-executable client that the guest user is logging off, as described above, and causes the instant messaging display window to close.

Figure 11:
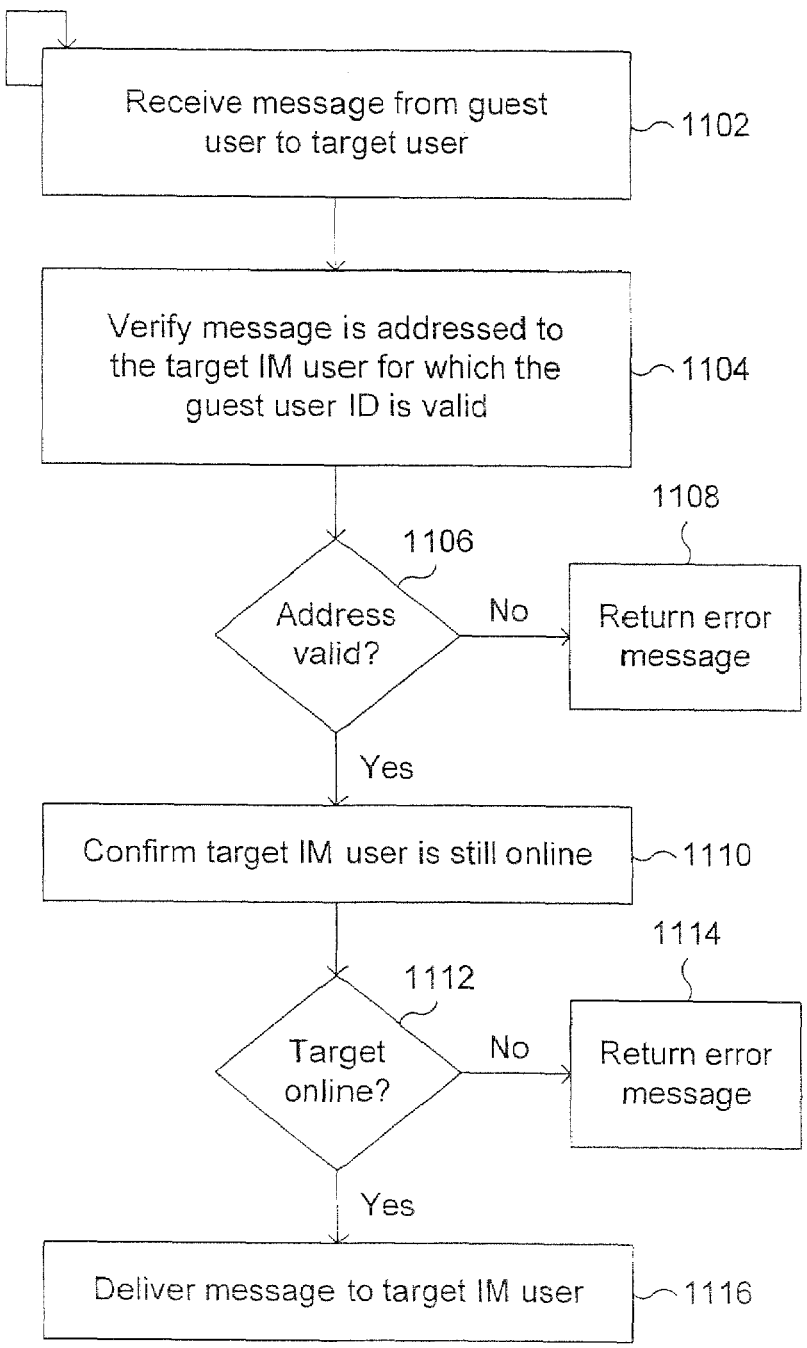
FIG. 11 is a flowchart illustrating a process used in one embodiment at the guest message server to process instant messages sent by a guest user. In step 1102, a message from the guest user to the inviting user is received at the connection server.

FIG. 11 is a flowchart illustrating a process used in one embodiment at the guest message server to process instant messages sent by a guest user. In step 1102, a message from the guest user to the inviting user is received at the connection server. In step 1104, the guest message server verifies that the message is addressed to the inviting instant messaging user for which the guest user identification is valid.

In step 1106, if it has been determined that the message is not addressed to the inviting instant messaging user for which the guest user identification is valid, the process proceeds to step 1108, in which an error message is returned to the guest user. If it has been determined in step 1106 that the message is addressed to the inviting instant messaging user for which the guest user identification is valid, the process proceeds to step 1110 in which the guest message server confirms that the inviting instant messaging user is still on line. In step 1112, if it has been determined that the inviting instant messaging user is not on line, the process proceeds to step 1114, in which an error message is returned to the guest user indicating that the inviting instant messaging user is not on line. If it has been determined in step 1112 that the inviting instant messaging user is on line, the message is delivered to the inviting instant messaging user in step 1116. In one embodiment, in step 1116, the connection server places the message in a form suitable for being sent to the inviting instant messaging user. In one embodiment, the form in which the message is placed prior to being sent to the inviting instant messaging user is determined at least in part by the version of the client side instant messaging application software installed at the inviting user's client system.

Figure 12:
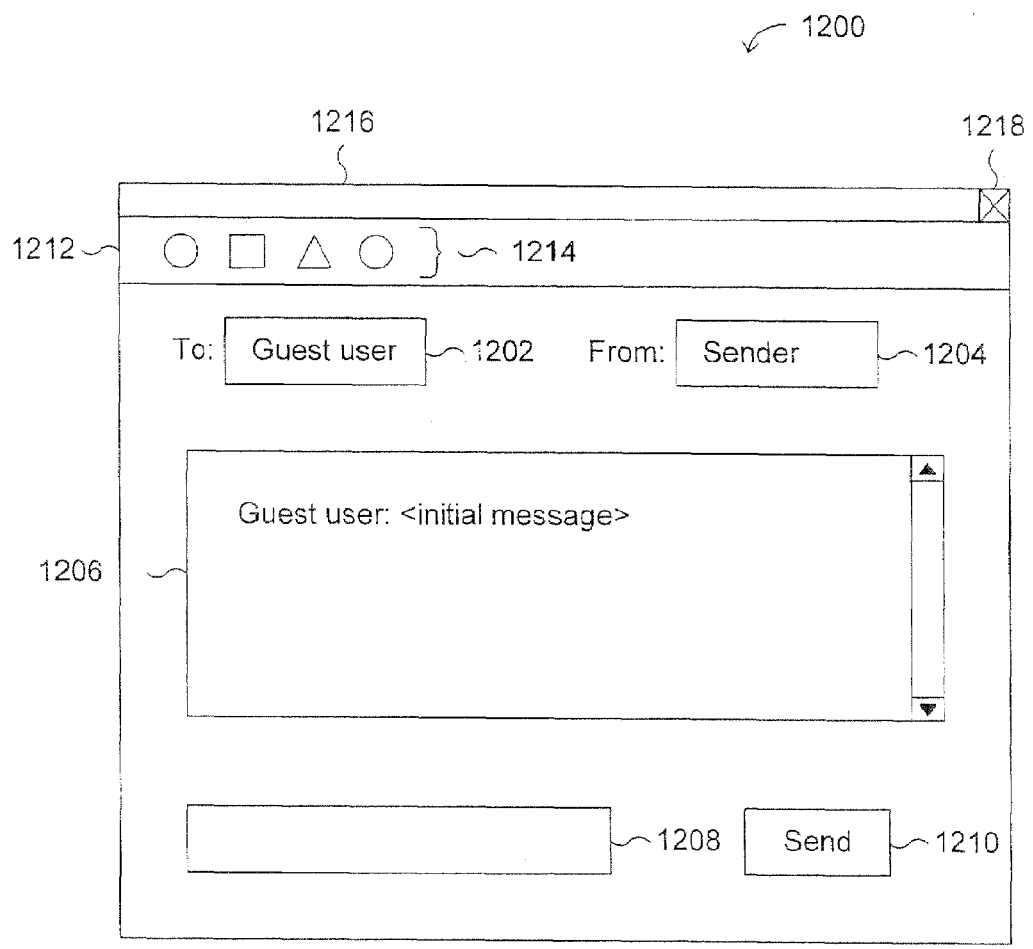
FIG. 12 is an illustration of an instant messaging display 1200 used in one environment to provide an instant messaging user interface to a registered instant messaging user for an instant messaging session with a guest user that is not a registered instant messaging user.

FIG. 12 is an illustration of an instant messaging display 1200 used in one environment to provide an instant messaging user interface to a registered instant messaging user for an instant messaging session with a guest user that is not a registered instant messaging user. The display 1200 comprises a target recipient identification display area 1202 in which an identification of the party to whom instant messages entered in the instant messaging window will be sent is displayed. In the example shown in FIG. 12, the target recipient is identified as "guest user". In one embodiment, the identification displayed in display area 1202 would be the guest user identification assigned by the connection server to the guest user. In one embodiment, the identification displayed in display area 1202 would be a display name entered by the guest user upon log in as described above. The display 1200 further comprises an originator identification display area 1204 in which identification of the sender of instant messages by means of the instant messaging window is displayed. In the example shown in FIG. 12, the originator is identified as "sender" to refer to the inviting user as the sender of the original electronic mail message containing the HTML messenger toolbox invoked by the guest user to engage in instant messaging with the sender.

The display 1200 further comprises a message text display area 1206 in which instant messages sent by any participant in the instant messaging session, or by the system, are displayed. In one embodiment, not illustrated in FIG. 12, a legend is provided at the top of the message text display area 1206, prior to displaying the first message from the guest user, which legend advises the inviting instant messaging user that the party with whom the instant messaging session is being conducted is a guest user and not a registered user of the instant messaging system. In one embodiment, the legend comprises instructions as to limitations or other differences in the functionality of the instant messaging system or program that may result from the fact that the other participant in the instant messaging session is not a registered user. For example, in one embodiment, the registered instant messaging user is warned that the guest user may not be the person he or she purports to be.

The display 1200 further comprises an instant message entry area 1208 in which the registered instant messaging user may enter instant messages to be sent to the guest user. The display 1200 further comprises a "send" button 1210, which the registered instant messaging user may select to send an instant message entered in the instant message entry area 1208 to the connection server for processing and delivery to the guest user.

The display 1200 further comprises a tool bar 1212 comprising a plurality of icons 1214, each of which corresponds to a function, operation, or service provided by the client side instant messaging application software. In one embodiment, when the other participant in the instant messaging session is a guest user, the display 1200 is modified such that only those functions that are available to the registered user for use with respect to an instant messaging session with a guest user are displayed in the tool bar 1212. In one embodiment, all of the icons normally included in the tool bar 1212 are displayed when the other participant is a guest user, but certain functions may be disabled by operation of the client side instant messaging application software when the other participant is a guest user. In one embodiment, the user identification of a participant in an instant messaging session may normally be added to a list of "friends" with whom the registered user more regularly communicates, and in one such embodiment this feature is disabled with respect to a guest user such that the guest user identification may not be added to the registered user's list of "friends". In one embodiment, features are disabled with respect to a guest user if the browser-executable instant messaging client being used by the guest user cannot support the feature, such as a feature providing advanced functionality such as voice communication. In one embodiment, if a registered user attempts to initiate an operation that is not valid with respect to a guest user, the client side application software returns an error message informing the user that the operation is not valid with respect to a guest user.

The display 1200 further comprises a browser window control bar 1216, which control bar comprises a window close control button 1218. In one embodiment, selection of the window close control button 1218 causes the client side instant messaging application software to send an indication to the connection server that the inviting instant messaging user has disconnected. In one alternative embodiment, closing the instant messaging window does not cause an indication to be sent to the connection server that the inviting instant messaging user has disconnected, and a registered user must instead select a separate option to disconnect or exit completely from the client side instant messaging software in order for such an indication to be sent. In one embodiment, a disconnect control button, not shown in FIG. 12, is included in the display 1200 to enable the registered user to indicate a desire to disconnect.

In one embodiment, the display 1200 further comprises a button which, when selected by the inviting instant messaging user, sends to the guest user a preformatted message inviting the guest user to become a registered user of the instant messaging system and thereby make it possible for the registered user and the guest user to communicate in an instant messaging session in which all of the features of the instant messaging system are available to both parties.

Figure 13:
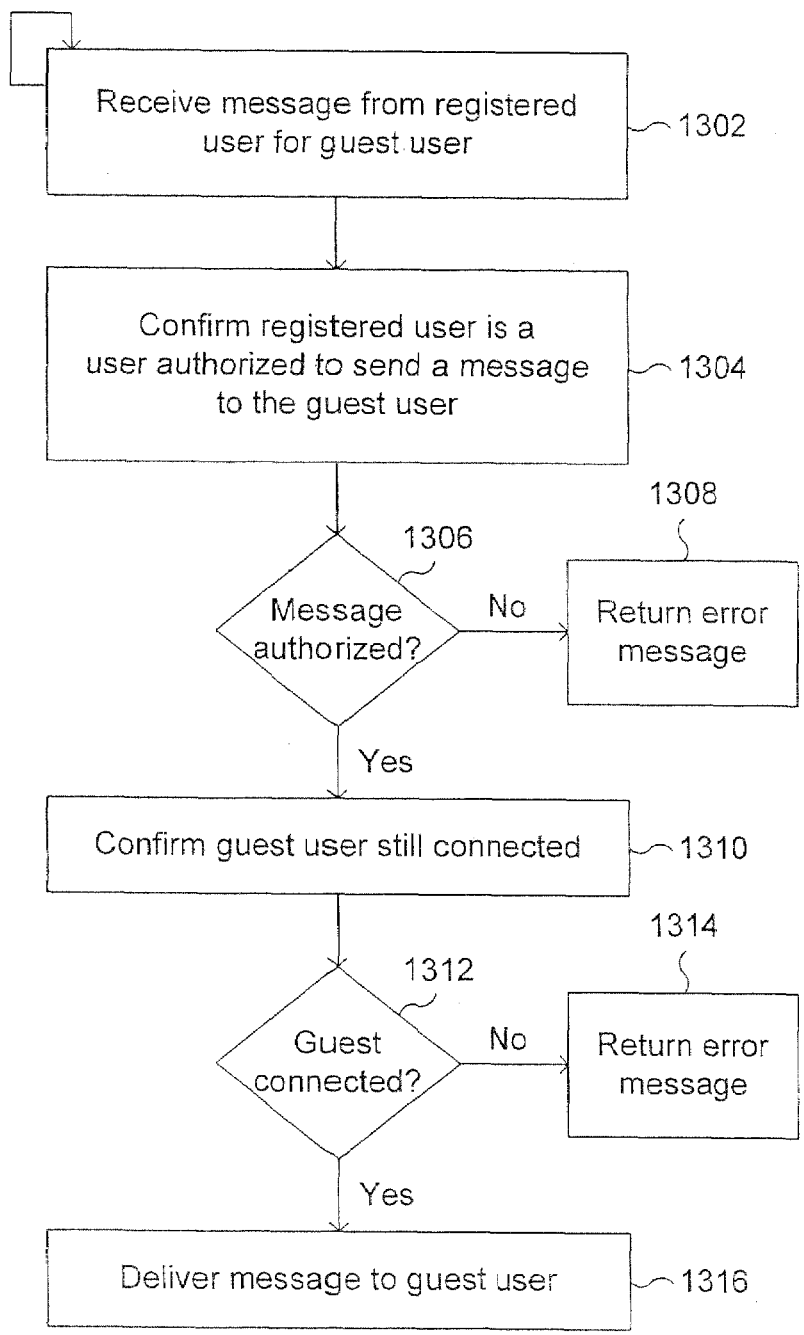
FIG. 13 is a flowchart illustrating a process used in one embodiment to process at the connection server instant messages sent from a registered instant messaging user to a guest user.

FIG. 13 is a flowchart illustrating a process used in one embodiment to process at the connection server instant messages sent from a registered instant messaging user to a guest user. In step 1302, an instant message from the registered instant messaging user to the guest user is received at the connection server. In step 1304, the connection server verifies that the registered user who sent the message is a user authorized to send a message to the guest user. In one embodiment, only the inviting user, i.e., the registered user associated with the HTML messenger toolbox invoked by the guest user, may send instant messages to the guest user. In step 1306, if it is determined that the sender of the messages is not authorized to send messages to the guest user, the process proceeds to step 1308 and an error message is returned to the sender of the message informing the sender that the sender is not authorized to send messages to the guest user. If it is determined in step 1306 that the sender of the messages is authorized to send messages to the guest user, the process proceeds to step 1310 in which the connection server confirms that the guest user is still connected to the instant messaging system. In step 1312, if it is determined that the guest user has logged off, the process proceeds to step 1314 in which an error message is returned to the registered user informing the registered user that the guest user has logged off. If it is determined in step 1312 that the guest user is still on line, the process proceeds to step 1316 in which the instant message is delivered to the guest user. In one embodiment, the messages are delivered to the guest user in a streamlined format that omits information identifying the sender of the message, because the browser-executable client at the guest user's client system is configured to assume that messages delivered from the connection server to the guest user originated from the registered instant messaging user authorized to send messages to the guest user.

Figure 14:
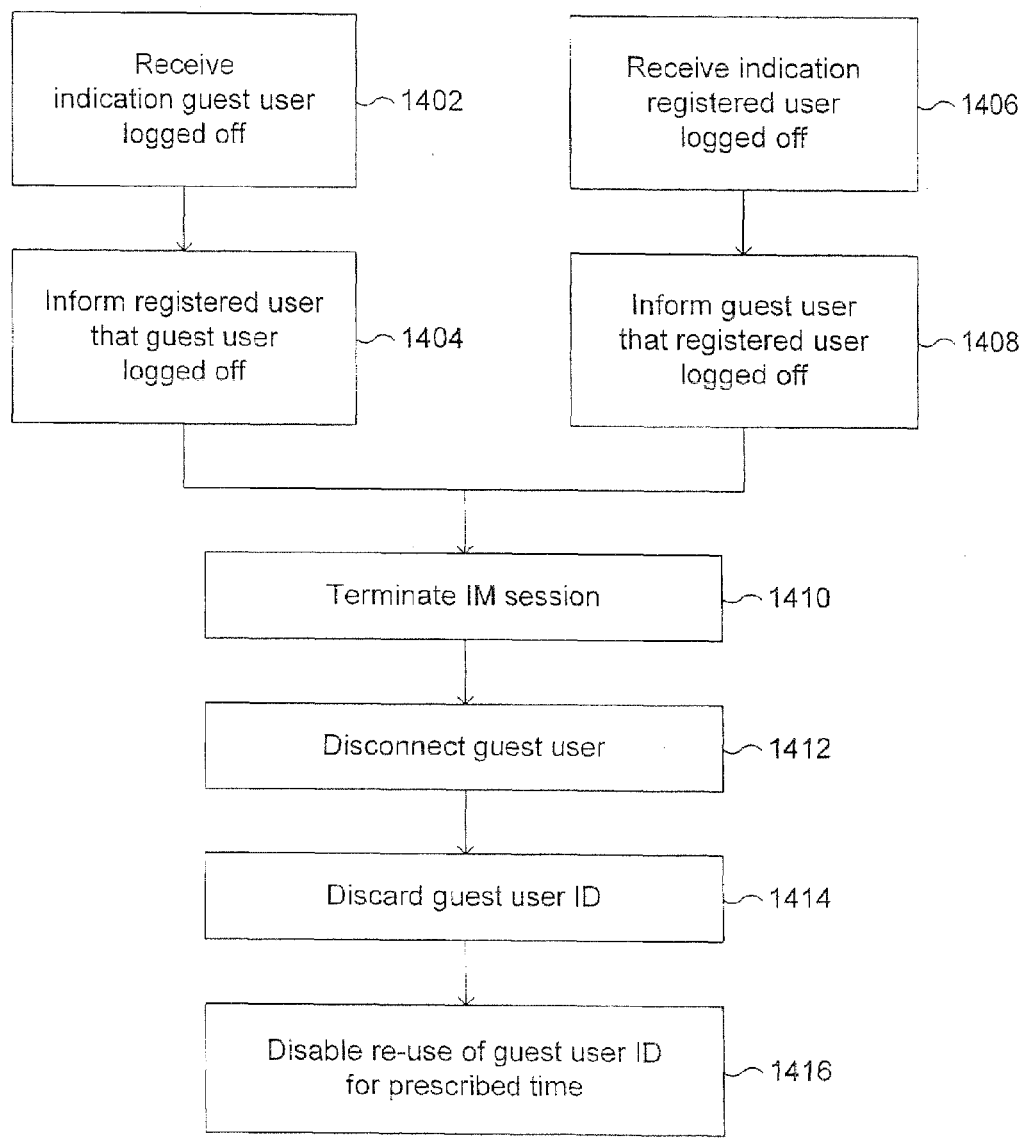
FIG. 14 is a flowchart illustrating a process used in one embodiment to process, at the connection server an indication that either the guest user or the inviting user has logged off, as in step 208 of the process shown in FIG. 2.

FIG. 14 is a flowchart illustrating a process used in one embodiment to process, at the connection server an indication that either the guest user or the inviting user has logged off, as in step 208 of the process shown in FIG. 2. With respect to a guest user, the process begins with step 1402 in which an indication is received at the connection server that the guest user has logged off. As described above, in one embodiment the browser-executable client at the guest user's client system sends such an indication to the connection server when the guest user indicates a desire to log off. In step 1404, the connection server informs the inviting instant messaging user that the guest user has logged off. In one embodiment, the client side instant messaging software installed at the inviting user's client system displays a message to the user upon receipt of the indication from the connection server and disables any further messages being sent to the guest user from the client system.

With respect to an indication received from the inviting instant messaging user, the process shown in FIG. 14 begins with step 1406, in which an indication is received at the connection server that the inviting instant messaging user has logged off. In step 1408, the connection server sends a message to the guest user informing the guest user that the inviting user has logged off. In one embodiment, the browser-executable client at the guest user's client system responds to receipt of an indication from the connection server that the inviting user has logged off by displaying a message to the guest user and by disabling any further messages being sent by the guest user.

Once the connection server has either sent a message to the inviting user in step 1404 or to the guest user in step 1408 as appropriate, the process shown in FIG. 14 proceeds to step 1410 in which the connection server terminates the instant messaging session between the inviting user and the guest user. In one embodiment, the termination of the instant messaging session in step 1410 comprises disabling the sending of any further messages between the inviting user and the guest user. In one embodiment, the termination of the instant messaging session in step 1410 comprises deleting one or more records so that the inviting user and the guest user are no longer associated with a valid instant messaging session identifier.

In step 1412, the guest user is disconnected from the instant messaging system. In one embodiment, the guest user is disconnected by rendering invalid the temporary guest user identification assigned to the guest user.

In step 1414, the guest user identification assigned to the guest user is discarded and deleted from any lists of currently valid user identifications maintained by the connection server. In one embodiment, the guest user identification is discarded by the system as part of the process of disconnecting the guest user in step 1412 and, in such an embodiment, step 1414 is omitted. In step 1416, the use of the discarded guest user identification is disabled for a prescribed period of time. In one embodiment, the use of the guest user identification is disabled for a prescribed period of time to prevent the fraudulent and/or erroneous use of the guest user identification by any participant in the prior authorized instant messaging session in which the guest user identification was used.

While the examples described in detail above deal primarily with providing instant messaging functionality in an electronic mail environment, the approach described above may similarly be used in other context, such as web-based message groups, personal or other home pages, auction web sites, public calendars, or in any other web page or network accessible location associated with an instant messaging user, or with any HTML-based or HTML-compatible electronic message or other document sent by a registered instant messaging user in an any network environment. Also, while the examples described in detail above discuss the use of HTML and DHTML to provide certain functionality, other programming languages may also be used to provide the functionality described without requiring the user to complete an extensive download, installation, and registration process. Examples of such other languages and tools include, without limitation, clients comprising computer code written in Java, JavaScript, Flash, and/or Active X.

While certain of the embodiments described in detail above involve an instant messaging session between a single registered user and a single guest user, the instant messaging session may as well involve a plurality of guest users and/or a plurality of registered instant messaging users.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for enabling a guest user who is not a registered user of an instant messaging system to communicate by instant messaging with a registered user of the instant messaging system, the method comprising:

receiving an initial indication that the guest user desires to communicate with a selected registered user of the instant messaging system by instant messaging, wherein the initial indication specifically identifies the selected registered user with whom the guest user desires to communicate;

wherein the instant messaging system is associated with at least one other registration-based service;

wherein the guest user is registered with the at least one other registration-based instant messaging system and wherein the guest user signs in using a user name to access the at least one other registration-based instant messaging system;

displaying the user name associated with the guest user with respect to the other service to identify the guest user to the selected registered user;

sending to a client computer system associated with the guest user browser-executable computer code comprising computer instructions for providing at least limited instant messaging functionality to the guest user at the client computer system, without requiring the guest user to download and install client side instant messaging application software and without requiring the guest user to register as a user of the instant messaging system;

wherein providing at least limited instant messaging functionality to the guest user includes displaying to the guest user an interface that includes controls for sending instant messages to the selected registered user, but does not include controls for one or more features provided by the client side instant messaging application software; and facilitating an instant messaging session between the guest user and the selected registered user.

2. The method of claim 1, wherein facilitating the instant messaging session comprises delivering instant messages from the guest user to the selected registered user.

3. The method of claim 1, further comprising providing an entry point configured to receive the initial indication from the guest user that the guest user desires to communicate with the selected registered user by instant messaging.

4. The method of claim 3, wherein the entry point is provided in an electronic mail message sent by the selected registered user to the guest user.

5. The method of claim 3, wherein the entry point is provided in a web page associated with the selected registered user.

6. The method of claim 3, wherein the entry point is provided in an electronic document associated with the selected registered user.

7. The method of claim 3, wherein the entry point is provided by computer code comprising code written in the HyperText Markup Language (HTML).

8. The method of claim 1, further comprising receiving an indication from the selected registered user that the selected registered user would like to incorporate into an electronic mail message to the guest user an entry point configured to receive an indication from the guest user that the guest user desires to communicate with the selected registered user by instant messaging.

9. The method of claim 1, further comprising receiving an indication from the selected registered user to incorporate into a web page associated with the selected registered user an entry point configured to receive an indication from the guest user that the guest user desires to communicate with the selected registered user by instant messaging.

10. The method of claim 1, wherein the computer code comprises a browser-executable instant messaging client.

11. The method of claim 10, wherein the browser-executable instant messaging client comprises computer instructions in the Dynamic HyperText Markup Language (DHTML).

12. The method of claim 10, wherein the browser-executable instant messaging client comprises computer instructions in JavaScript.

13. The method of claim 10, wherein the browser-executable instant messaging client comprises computer instructions in ActiveX.

14. The method of claim 1, wherein displaying the user name associated with the guest user with respect to the other service to identify the guest user to the selected registered user further comprises defining the user name associated with the guest user as a temporary user identification in the instant messaging system.

15. The method of claim 14, wherein the temporary user identification is at least temporarily deactivated upon termination of the instant messaging session between the guest user and the selected registered user.

16. The method of claim 14, wherein the temporary user identification is valid only for instant messaging with the selected registered user.

17. The method of claim 1, wherein cookie information is used to determine if the guest user is signed in as a user of the at least one other registration-based service.

18. The method of claim 1, wherein the computer code is configured to display an instant messaging window to the guest user.

19. The method of claim 18, wherein the instant messaging window comprises an area for displaying messages sent by either the guest user or the selected registered user.

20. The method of claim 18, wherein the instant messaging window comprises an area for entering the text of a message to be sent and displayed to the selected registered user essentially in real time.

21. The method of claim 1, further comprising advising the selected registered user that the guest user is not a registered user.

22. The method of claim 1, wherein the selected registered user is associated with a registered user client computer system on which client side instant messaging application software associated with the instant messaging system is installed and the method further comprises disabling, at least with respect to the guest user, at least one feature of the client side instant messaging application software installed on said registered user client computer system.

23. The method of claim 22, wherein disabling, at least with respect to the guest user, at least one feature of the client side instant messaging application software on said registered user client computer system includes a disabling feature that would otherwise have allowed the selected registered user to add the temporary user identification assigned to the guest user to a list of users whose online presence is monitored by the client side instant messaging application software installed on said registered user client computer system.

24. The method of claim 22, wherein the at least one feature is one that the computer code sent to the guest user's client computer system does not support.

25. A method for enabling an invited user who may not be a registered user of an instant messaging system, said instant messaging system including client side instant message application software, to communicate by instant messaging with an inviting user who is a registered user of the system, the method comprising:
  sending an invitation to the invited user that indicates that the inviting user desires to communicate with the invited user;
  wherein said invitation includes an entry point configured to receive an initial indication from the invited user that the invited user desires to communicate with the selected registered user by instant messaging;
  activating said entry point by the invited user, wherein activating said entry point causes the initial indication that the invited user desires to communicate with the inviting user by instant messaging to be sent;
  receiving the initial indication that the invited user desires to communicate with the inviting user by instant messaging, wherein the initial indication specifically identifies the inviting user with whom the guest user desires to communicate;
  sending to a client computer system associated with the invited user browser-executable computer code comprising computer instructions for:
    determining whether the client side instant messaging application software associated with the instant messaging system is installed in the client computer system; and
    in the event it is determined that the client side instant messaging application software associated with the instant messaging system is not installed in the client computer system, providing at least limited instant messaging functionality to the invited user at the client computer system, without requiring the invited user to download and install the client side instant messaging application software and without requiring the invited user to register as a user of the instant messaging system;
  wherein providing at least limited instant messaging functionality to the invited user includes displaying to the invited user an interface that includes controls for sending instant messages to the inviting user, but does not include controls for one or more features provided by the client side instant messaging application software; and
  facilitating an instant messaging session between the invited user and the inviting user.

26. The method of claim 25, further comprising:
  in the event it is determined that the client side instant messaging application software associated with the instant messaging system is installed in the client computer system, activating and using the installed client side instant messaging application software to enable the invited user to communicate with the inviting user by instant messaging.

27. The method of claim 25, wherein said computer instructions for determining whether the client side instant messaging application software associated with the instant messaging system is installed in the client computer system comprises computer code written in the JavaScript programming language.

28. The method of claim 25, wherein said computer instructions for determining whether the client side instant messaging application software associated with the instant messaging system is installed in the client computer system comprises computer code written in the VBScript programming language.

29. The method of claim 25, wherein said computer instructions for determining whether the client side instant messaging application software associated with the instant messaging system is installed in the client computer system comprises computer code written in the ActiveX programming language.

30. A system for enabling a guest user who is not a registered user of an instant messaging system to communicate by instant messaging with a registered user of the system, comprising:
  a web server configured to:
    receive an initial indication that the guest user desires to communicate with a selected registered user of the instant messaging system by instant messaging, wherein the initial indication specifically identifies the selected registered user with whom the guest user desires to communicate;
    wherein the instant messaging system is associated with at least one other registration-based service;
    wherein the guest user is registered with the at least one other registration-based instant messaging system and wherein the guest user signs in using a user name to access the at least one other registration-based instant messaging system;
    display the user name associated with the guest user with respect to the other service to identify the guest user to the selected registered user; and send to a client computer system associated with the guest user browser-executable computer code comprising computer instructions for providing at least limited instant messaging functionality to the guest user at the client computer system, without requiring the guest user to download and install client side instant messaging application software and without requiring the guest user to register as a user of the instant messaging system;

wherein providing at least limited instant messaging functionality to the guest user includes displaying to the guest user an interface that includes controls for sending instant messages to the registered user, but does not include controls for one or more features provided by the client side instant messaging application software; and an instant messaging server configured to facilitate an instant messaging session between the guest user and the selected registered user.

31. The system of claim 30, wherein said web server comprises a plurality of servers.

32. The system of claim 30, wherein said instant messaging server comprises a plurality of servers.

33. A computer program product embodied on a computer readable storage medium for enabling a guest user who is not a registered user of an instant messaging system to communicate by instant messaging with a registered user of the system, the computer program product comprising computer instructions for:

receiving an initial indication that the guest user desires to communicate with a selected registered user of the instant messaging system by instant messaging, wherein the initial indication specifically identifies the selected registered user with whom the guest user desires to communicate;

wherein the instant messaging system is associated with at least one other registration-based service;

wherein the guest user is registered with the at least one other registration-based instant messaging system and wherein the guest user signs in using a user name to access the at least one other registration-based instant messaging system;

displaying the user name associated with the guest user with respect to the other service to identify the guest user to the selected registered user;

sending to a client computer system associated with the guest user browser-executable computer code comprising computer instructions for providing at least limited instant messaging functionality to the guest user at the client computer system, without requiring the guest user to download and install client side instant messaging application software and without requiring the guest user to register as a user of the instant messaging system;

wherein providing at least limited instant messaging functionality to the guest user includes displaying to the guest user an interface that includes controls for sending instant messages to the selected registered user, but does not include controls for one or more features provided by the client side instant messaging application software; and facilitating an instant messaging session between the guest user and the selected registered user.

34. A method for enabling a guest user who is not a registered user of an instant messaging system to communicate by instant messaging with a registered user of the system, the method comprising:

receiving an initial indication that the guest user desires to communicate with a selected registered user by instant messaging, wherein the initial indication specifically identifies the selected registered user with whom the guest user desires to communicate;

wherein the selected registered user is associated with a registered user client computer system on which client side instant messaging application software associated with the instant messaging system is installed;

sending to a client computer system associated with the guest user browser-executable computer code comprising computer instructions for providing limited instant messaging functionality to the guest user at the client computer system, without requiring the guest user to download and install client side instant messaging application software and without requiring the guest user to register as a user of the instant messaging system;

wherein providing at least limited instant messaging functionality to the guest user includes displaying to the guest user an interface that includes controls for sending instant messages to the registered user, but does not include controls for one or more features provided by the client side instant messaging application software;

disabling, at least with respect to the guest user, at least one feature of the client side instant messaging application software installed on said registered user client computer system;

wherein disabling, at least with respect to the guest user, at least one feature of the client side instant messaging application software on said registered user client computer system includes disabling at least one feature that would otherwise have allowed the selected registered user to add the temporary user identification assigned to the guest user to a list of users whose online presence is monitored by the client side instant messaging application software installed on said registered user client computer system; and facilitating an instant messaging session between the guest user and the selected registered user.

35. The method of claim 34, wherein the disabled feature is one that the computer code sent to the guest user's client computer system does not support.

* * * * *